US010027775B1

(12) United States Patent
Mierau et al.

(10) Patent No.: US 10,027,775 B1
(45) Date of Patent: Jul. 17, 2018

(54) PRESENTATION OF STATUS INFORMATION IN A MESSAGING ENVIRONMENT

(71) Applicant: PATH MOBILE INC PTE. LTD., Singapore (SG)

(72) Inventors: Dustin Mierau, San Francisco, CA (US); Emilie Kim, San Francisco, CA (US); David Yung, Concord, CA (US)

(73) Assignee: PATH MOBILE INC PTE. LTD., Singapore (SG)

( * ) Notice: Subject to any disclaimer, the term of this patent is extended or adjusted under 35 U.S.C. 154(b) by 306 days.

(21) Appl. No.: 14/745,206

(22) Filed: Jun. 19, 2015

Related U.S. Application Data

(60) Provisional application No. 62/015,330, filed on Jun. 20, 2014.

(51) Int. Cl.
*H04L 29/08* (2006.01)
*H04L 12/58* (2006.01)

(52) U.S. Cl.
CPC ............ *H04L 67/24* (2013.01); *H04L 51/043* (2013.01); *H04L 67/18* (2013.01)

(58) Field of Classification Search
CPC ......... H04L 67/18; H04L 67/22; H04L 67/24; H04L 51/043; H04L 51/046
See application file for complete search history.

(56) References Cited

U.S. PATENT DOCUMENTS

| 8,694,479 | B1 * | 4/2014 | Heyworth | H04L 67/06 |
| | | | | 705/310 |
| 9,401,812 | B1 * | 7/2016 | Jachner | H04L 12/18 |
| 9,641,677 | B2 * | 5/2017 | Lawson | H04M 3/42374 |
| 9,729,649 | B1 * | 8/2017 | Beguin | H04L 12/581 |
| 9,749,842 | B2 * | 8/2017 | Buzescu | H04W 8/22 |
| 2002/0114441 | A1 * | 8/2002 | Coussement | H04M 3/5175 |
| | | | | 379/265.06 |
| 2004/0193686 | A1 * | 9/2004 | Blagsvedt | H04L 67/24 |
| | | | | 709/206 |
| 2005/0197995 | A1 * | 9/2005 | Badt, Jr. | H04L 67/24 |
| 2006/0224688 | A1 * | 10/2006 | Morris | H04L 63/0236 |
| | | | | 709/217 |
| 2006/0245391 | A1 * | 11/2006 | Vaidya | H04M 3/42153 |
| | | | | 370/329 |
| 2006/0248185 | A1 * | 11/2006 | Morris | G06Q 10/109 |
| | | | | 709/224 |
| 2007/0123286 | A1 * | 5/2007 | Mock | H04L 67/24 |
| | | | | 455/518 |

(Continued)

*Primary Examiner* — Kostas Katsikis
(74) *Attorney, Agent, or Firm* — Cantor Colburn LLP

(57) ABSTRACT

A user's user device includes a messaging module that allows the user to communicate with its contacts through a messaging system. The messaging module also allows the user to access a status interface that includes a feed with multiple status items. Each status item indicates current information associated with a contact of the user. The status items are received by the messaging module from the messaging system. The messaging system creates the status items based on device information automatically provided to the system by user devices. One or more of the status items received by the messaging module are customized by the module after they are received from the messaging system and before they are presented to the user in the status interface. The status items are customized based information associated with the user.

21 Claims, 13 Drawing Sheets

(56) References Cited

U.S. PATENT DOCUMENTS

| | | | | |
|---|---|---|---|---|
| 2007/0226357 | A1* | 9/2007 | McMurry | H04L 67/24 709/229 |
| 2007/0265859 | A1* | 11/2007 | Jachner | G06Q 10/06 705/34 |
| 2008/0235090 | A1* | 9/2008 | Lundstrom | G06Q 30/02 705/14.67 |
| 2009/0147772 | A1* | 6/2009 | Rao | H04L 12/1818 370/352 |
| 2009/0234927 | A1* | 9/2009 | Buzescu | H04L 67/24 709/206 |
| 2009/0280843 | A1* | 11/2009 | Wisebourt | H04L 51/043 455/466 |
| 2010/0031182 | A1* | 2/2010 | Thean | G06Q 10/06 715/772 |
| 2010/0087230 | A1* | 4/2010 | Peh | G06F 3/04817 455/566 |
| 2010/0205242 | A1* | 8/2010 | Marchioro, II | G06Q 10/10 709/203 |
| 2010/0214090 | A1* | 8/2010 | Sartini | H04L 12/581 340/517 |
| 2010/0223324 | A1* | 9/2010 | Kawai | G06Q 10/06 709/203 |
| 2011/0082747 | A1* | 4/2011 | Khan | G06Q 10/00 705/14.58 |
| 2011/0173280 | A1* | 7/2011 | Ishikawa | G06Q 10/107 709/206 |
| 2011/0249658 | A1* | 10/2011 | Wohlert | H04W 4/04 370/338 |
| 2012/0148033 | A1* | 6/2012 | Tibbits | H04L 51/02 379/88.12 |
| 2012/0302256 | A1* | 11/2012 | Pai | H04W 4/02 455/456.2 |
| 2013/0072153 | A1* | 3/2013 | Lawson | H04L 63/10 455/410 |
| 2013/0204966 | A1* | 8/2013 | Lee | G06Q 30/0243 709/217 |
| 2013/0290457 | A1* | 10/2013 | Wang | H04L 51/043 709/206 |
| 2014/0113646 | A1* | 4/2014 | Maggenti | H04L 67/306 455/452.1 |
| 2014/0157329 | A1* | 6/2014 | Roberts | H04L 67/10 725/61 |
| 2014/0162692 | A1* | 6/2014 | Li | H04L 67/40 455/456.2 |
| 2014/0172485 | A1* | 6/2014 | Thean | G06Q 10/06 705/7.17 |
| 2014/0364151 | A1* | 12/2014 | Schiff | H04L 63/0838 455/456.3 |
| 2015/0327019 | A1* | 11/2015 | Baboescu | H04W 4/12 455/456.3 |

* cited by examiner

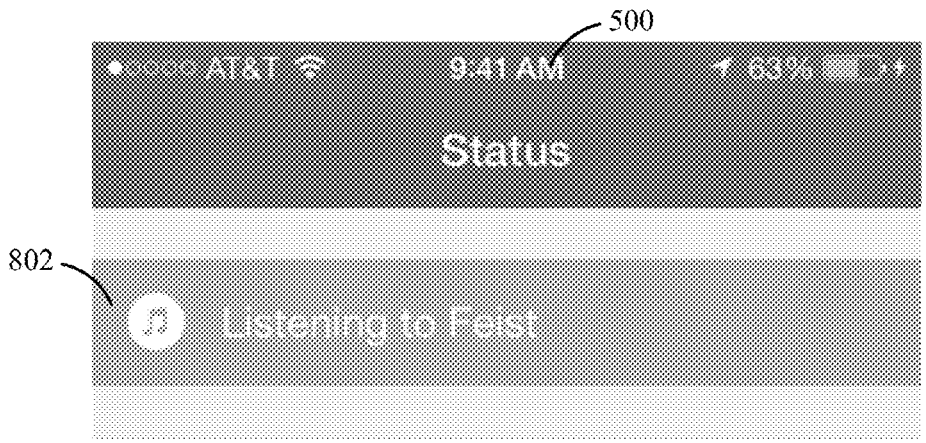
802
Dave Morin is in transit
Dario Marcato is nearby
Richard Nghiem is in Mission Bay
Roxy Sarbaz is in transit
Nicolas Melo is nearby
Maria Neumayer is nearby
Kallol Das is in Lake Street
FIG. 8

PRESENTATION OF STATUS INFORMATION IN A MESSAGING ENVIRONMENT

CROSS REFERENCE TO RELATED APPLICATIONS

This application claims the benefit of U.S. Provisional Application No. 62/015,330, filed Jun. 20, 2014, which is incorporated by reference in its entirety.

BACKGROUND

1. Field of Art

The disclosure generally relates to messaging, and in particular to presenting to a user status information related to contacts with which the user is capable of exchanging messages.

2. Description of the Related Art

Users of mobile devices typically use messaging applications to exchange messages with their contacts. However, with current messaging applications if a user wants to obtain any information about a contact, the user has to send a message to the contact asking for the information. It may take the user a long time to receive a response if the contact is busy when he receives the message or does not see the message until some later time. Further, current messaging applications do not encourage users to communicate with their contacts.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

FIGS. 5-13 illustrate examples of a status interface according to one embodiment.

SUMMARY

Figure 1:
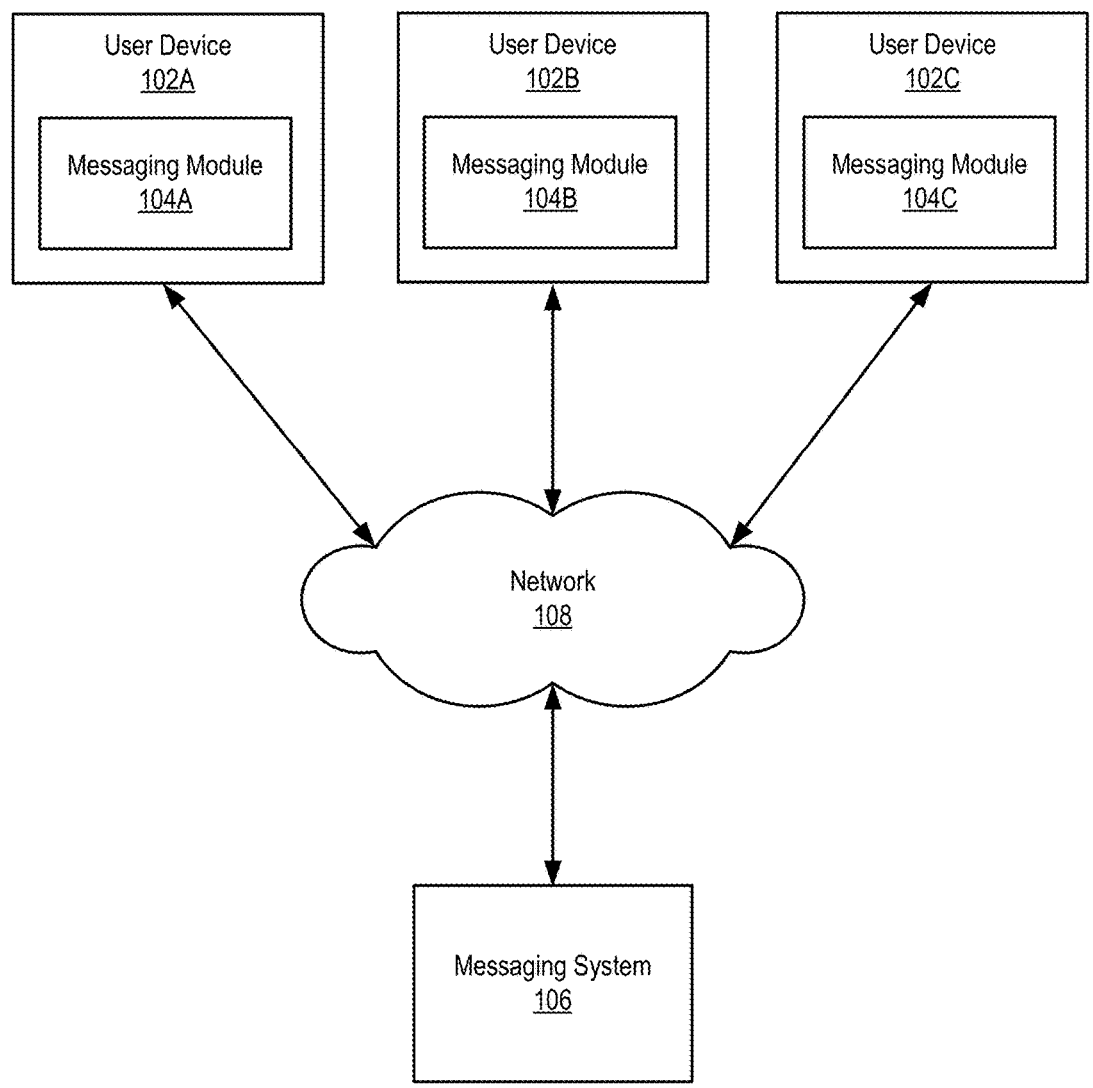
FIG. 1 is a block diagram of a messaging environment according to one embodiment.

One embodiment of a disclosed system, method and computer readable storage medium includes users of a messaging system accessing a status interface that includes a feed of status items associated with contacts of the users. A user's user device of includes a messaging module that allows the user to communicate with its contacts through a messaging system. The messaging module allows the user to access a status interface that includes a feed with multiple status items. Each status item indicates current information associated with a contact of the user. A status item may indicate, for example, the location of a contact, the battery life of a contact's device, that a contact is listening to music, that a contact is working out (e.g., running or cycling), that a contact is in transit (e.g., driving, train, or bus), or that a contact is available to chat (e.g., the contact's device is currently running the messaging module).

The status items are received by the messaging module from the messaging system. The messaging system creates the status items based on device information automatically provided to the system by user devices. One or more of the status items received by the messaging module are customized by the module after they are received from the messaging system and before they are presented to the user in the status interface. The status items are customized based information associated with the user.

For example, for a status item indicating the location of a contact, the messaging module may customize the status item based on the current location of the user. If the status item received from the messaging system indicates that the contact is in the same city as the user, the messaging module may customize the status item to show the neighborhood that the contact is in within the city instead of just the city. However, if the status item indicates that the contact is in a different city than the user, the messaging module may customize the status item to include weather information along with the name of the city. If the user and the contact are in the same city there is no need to include weather information since the user already knows what the weather is like. Hence, in this example, the level of detail that is included in the status item is dependent on the location of the user.

In one embodiment, for each contact, the messaging module includes at most a single status item in the status item feed. Each status item has a priority and an expiration time associated with it. The priority and expiration time are assigned by the messaging system. If the messaging module has multiple status items for a contact that have not expired, the messaging module presents the status item with the highest priority in the feed. If a status item for the contact is later received with a higher priority, the messaging module removes the presented status item from the feed and includes the higher priority item. Further, if the presented status item expires (the expiration time of the item is reached) or if the messaging module receives information from the messaging system indicating that the status item is no longer relevant (e.g., the item indicates that the contact is in transit and the contact is no longer in transit), the messaging module removes the status item from the feed and presents a status item of the contact with the next highest priority. In another embodiment, the messaging module may include multiple status items in the feed for a contact. For example, the messaging module may include in the feed a contact's two highest priority status items. Further, the messaging module may combine multiple status items and display them in the feed as a single item.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Architecture

FIG. 1 is a block diagram of a messaging environment according to one embodiment. FIG. 1 illustrates user devices 102A, 102B, and 102C, and a messaging system 106 connected via a network 108. Although a select number of each entity are shown in FIG. 1, embodiments can have more or less of each entity (e.g., additional user devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

A user device 102 is a computing device capable of receiving user inputs as well as transmitting and/or receiving data via the network 108. In one embodiment, a user device 102 is a mobile device, such as a mobile telephone, a tablet computer, or a personal digital assistant (PDA). Alternatively, a user device 102 may be a conventional computer system, such as a desktop computer.

Each user device 102 includes a messaging module 104 that allows a user of the messaging system 106 to exchange messages with its contacts. When a user of a device 102 requests to transmit a message to a contact, the messaging module 104 transmits the message to the messaging system 106 which forwards the message to a device 102 used by the contact to receive messages. In other embodiments, the messaging module 104 sends the message directly to the contact's device 102 (e.g., through a peer-to-peer connection). A message exchanged via the messaging system 106 may include one or more of the following: text, video content, a picture/still image, audio, animations, graphics, icons, and any other type of media. A contact is a user of the messaging system 106 for which the messaging module 104 stores or is able to access contact information (e.g., a phone number, a user identifier, an email address) that can be used to communicate with the user. A contact may be, for example, a user of the messaging System 106 in an address book/contact list, a user of the messaging system 102 with which the user of the device 102 has a connection in a social network, or someone with whom the user of the device 102 has previously exchanged messages.

The messaging module 104 when executed by a device 102 of a user continuously obtains device information and transmits the information to the messaging system 106. The device information is transmitted to the messaging system 106 so that the system 106 can create status items and distribute the status items to the user's contacts for inclusion in status item feeds. In one embodiment, the messaging module 104 automatically obtains and transmits the device information to the messaging system 106 without the user having to request that the information be transmitted each time. In one embodiment, the messaging module 104 automatically obtains and transmits the device information after the user agrees to share his or her device information, for example, as part of a user preference.

The device information obtained and transmitted by the messaging module 104 to the messaging system 106 is current information associated with the user device 102 executing the messaging module 104. The device information transmitted to the messaging system 106 may include one or more of the following: a location of the device 102 (e.g., GPS location information obtained by the device), a state of charge of the device's battery, an indication as to whether the user of the device 102 is walking, running, cycling, or in transit (e.g., in a car, train, or bus), an indication that the messaging module 104 is currently being run on the device 102, an indication that a media item is being presented by a media player (e.g., a song is being played) and information associated with the media item (e.g., the name of the song), a media item recently captured by the device 102 (e.g., a picture), an indication as to one more applications executing on the device 102, actions performed by the user using an application on the device 102, information provided by an application executing on the device 102, and information generated/captured by one or more components of the device 102 (e.g., sensor information).

In one embodiment, the messaging module 104 obtains the device information using system level APis and/or application level APis. In one embodiment, the messaging module 104 obtains and transmits device information when messaging module 104 is launched, periodically, and/or when certain device information changes.

When the user of the device 102 requests to access a status interface, the messaging module 104 displays a status interface including a feed of status items received from the messaging system 106 for the user's contacts. Each status item received from the messaging system 106 has an expiration time and a priority associated with it. In one embodiment, to create the feed, for each contact for which the messaging module 104 has one or more stored status items that have not yet expired, the messaging module 104 selects a status item to display in the feed for the contact. The messaging module 104 selects to display for the contact the status item with the highest priority among the status items stored for the contact. In another embodiment, the messaging module 104 selects to display multiple status items (e.g., the status items with the two highest priorities). In one embodiment, the messaging module 104 selects multiple status items of the contact and combines them a single item. For example, if two status items have the same highest priority, the messaging module 104 may combine them.

In another embodiment, the messaging module 104 only includes status items in the feed of contacts selected by the user. In another embodiment, the messaging module 104 only includes status items in the feed of contacts with whom the user frequently communicates (e.g., communicate with a contact more than a threshold number of times per a time period, such as more than once a day) or of contacts that have a certain type of relationship with the user (e.g., in a social network or in real-life).

In one embodiment, prior to the messaging module 104 displaying a status item in the feed, the messaging module 104 customizes the status item based on information associated with the user. A status item may be customized, for example, based on or more of the following: the current location of the user, previous locations of the user, interests of the user, and previous actions by the user.

In one embodiment, if a status item indicates the location of a contact, the messaging module 104 customizes the level of detail included in the status item as to the contact's location. The status item is customized based on the user's current location and/or the user's previous locations. In one embodiment, if the status item indicates that the contact is currently in the same city as the user, but in a different neighborhood than the user, the messaging module 104 customizes the status item to display the neighborhood within the city where the contact is located. If the status item indicates that the contact is currently in the same city and the same neighborhood within the city, the messaging module 104 customizes the status item to display that the contact is nearby. However, if the status item indicates that the contact is at a business where the user is also currently at or the user has previously been to the business, the messaging module 104 customizes the status item to display the name of the business and/or the business' full address (e.g., street, city, and state). If the status item indicates that the contact is currently in a different city than the user, the messaging module 104 customizes the status item to display the name of the city where the contact is located and the current weather in the city where the contact is located.

In one embodiment, if a status item indicates that a media item is being presented to a contact and the user has previously accessed (e.g., seen and/or heard) the same media item, the messaging module 104 customizes the status item to indicate other media items that the contact has previously accessed or other media items for which the contact has indicated affinity (e.g., media item identified by the contact as favorites) because the user may also be interested in those media items. For example, if a status item identifies a song that a contact is currently listening to and the user has previously listened to the song, the messaging module 104 may customize the status item to indicate related songs that the contact has previously heard in addition to the name of the song that the contact is currently listening to.

In one embodiment, the messaging module 104 only customizes certain types of status item or when information is available that can be used to customize status items. For example, the messaging module 104 may customize status items indicating locations of contacts, but does not customize status items indicating the remaining battery life of the contacts' user devices 102.

In one embodiment, the status items included in the feed are ordered based on the time received from the messaging system 106. The most recently received status items are displayed at the top of the feed and the oldest status items are displayed at the bottom of the feed. In the status interface, a status item for the user of the device 102 is also displayed by the messaging module 104. In one embodiment, the status item to display for the user is received from the messaging system 106. In another embodiment, the messaging module 104 creates the status item based on the most recent device information transmitted to the messaging system 106.

If a contact's status item in the feed reaches its expiration time or if the messaging module 104 receives information from the messaging system 106 indicating that the status item is no longer relevant, the messaging module 104 removes the status item from the feed. The messaging module 104 adds to the feed a stored status item for the contact with the next highest priority. For example, the messaging system 106 may indicate that a status item is no longer relevant if the status states that a contact is listening to a song and the contact is no longer listening to the song. In another embodiment, instead of removing the status item and adding the next highest priority item to the feed, the next highest priority item replaces the status item in the feed. Hence, the next highest priority item takes the position of the status item in the feed.

When the messaging module 104 receives a new status item for a contact from the messaging system 106, the messaging module 104 stores the status item. Additionally, messaging module 104 determines whether to include received status item in the feed. In one embodiment, if the feed does not currently include a status item for the contact, the messaging module 104 determines to include the received status item in the feed. If a status item is already included in the feed for the contact but the received item has a higher priority than the item currently in the feed, the messaging module 104 determines to remove the current item in the feed and to add the received item to the feed (e.g., to the top of the feed). In one embodiment, received item replaces the current item in the feed at its current position.

The messaging system 106 is a computer system that allows users to exchange messages. For each user, the messaging system 106 stores information as to the contacts of the user. When the messaging system 106 receives device information from a user's device 102, the messaging system 106 creates one or more status items based on the device information. In one embodiment, if the device information indicates a current location of the user, the messaging system 106 creates a location status item including the location of the user. If the device information includes a current state of the user's device 102, the messaging system 106 creates a battery status item including the device's current state of charge. If the device information indicates that a media item is currently being presented to the user, the messaging system 106 creates a media status item indicating that the media item is being presented to the user. If the device information indicates that the user's device 102 is currently executing the messaging module 104, the messaging system 106 creates an available status item indicating how long the messaging module 104 has been running on the user device 102. If the device information indicates that the user is running or bicycling, the messaging system 106 creates a workout status item indicating that the user is running or bicycling. If the device information indicates that the user is in transit, the messaging system 106 creates a transit status item indicating that the user is driving, on a train, or on a bus.

In one embodiment, the device information received from a user device 102 does not specifically indicate whether a user is running, bicycling, or in transit, but rather the device information includes information generated by one or more resources (e.g., sensors) of the device 102. The information generated by the resources can be used by the messaging module 104 to determine whether the user is running, bicycling, or in transit, which can be used to create a workout or transit status item if appropriate. Other types of status items that may be generated by the messaging system 106 based on the device information may include media items recently created on the device 102, an indication as to an application executing on the device 102, or information provided by an application executing on the device 102.

With each status item created by the messaging system 106, the messaging system 106 associates a priority and an expiration time. In one embodiment, the messaging system 106 associates a priority and an expiration time with a status item based on a type of the status item. For example, the messaging system 106 may associate a certain priority and expiration time with location status items, which is different that the priority and expiration time associated with battery status items. In one embodiment, the priority and the expiration time for each type of status item is preset by a system administrator.

For each status item created based on a user's device information, the messaging system 106 transmits the status item to one or more contacts of the user along with the associated priority and expiration time. In one embodiment, the messaging system 106 transmits the status item to each of the user's contact. In one embodiment, the messaging system 106 transmits the status item to contacts previously selected by the user (e.g., as part of user preferences). The user may indicate that different types of status items be sent to different contacts. For example, the user may indicate that battery status items be sent to all contacts, but that location status items only be sent to a certain set of friends. In other embodiments, the messaging system 106 only transmits the status item to contacts with whom the user recently communicated, to randomly selected contacts, contacts witch which the user frequently communicates, contact with which the user had not communicated with in an extended period of time, contacts that have expired status items for the user, contacts that don't have expired status items for the user, and contacts in close proximity to the user.

In one embodiment, if a status item is transmitted to a contact and the contact has an older status item of the same type (e.g., transmit a new location status item and contact has an older location status item), the messaging system 106 transmits information to the contact indicating that the older status item is no longer relevant and should not be displayed. Further, if the messaging system 106 receives information from a device 102 of a user indicating that a status item provided to one or more contacts is no longer relevant, the messaging system 106 notifies the contacts that the status item is no longer relevant.

It should be understood that operations described herein as being performed by a user device 102/messaging module 104 may be performed by the messaging system 106 in other embodiments. Similarly, operations described as being performed by the messaging system 106 can be performed by a user device 102 in other embodiments.

The network 108 enables communications between the various entities of the environment 100. In one embodiment, the network 108 uses standard communications technologies and/or protocols. Thus, the network 108 can include links using technologies such as Ethernet, Wireless Fidelity (WiFi) (e.g., 802.11), worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 108 can include multiprotocollabel switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 108 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 108 can also include links to other networks such as the Internet.

Figure 2:
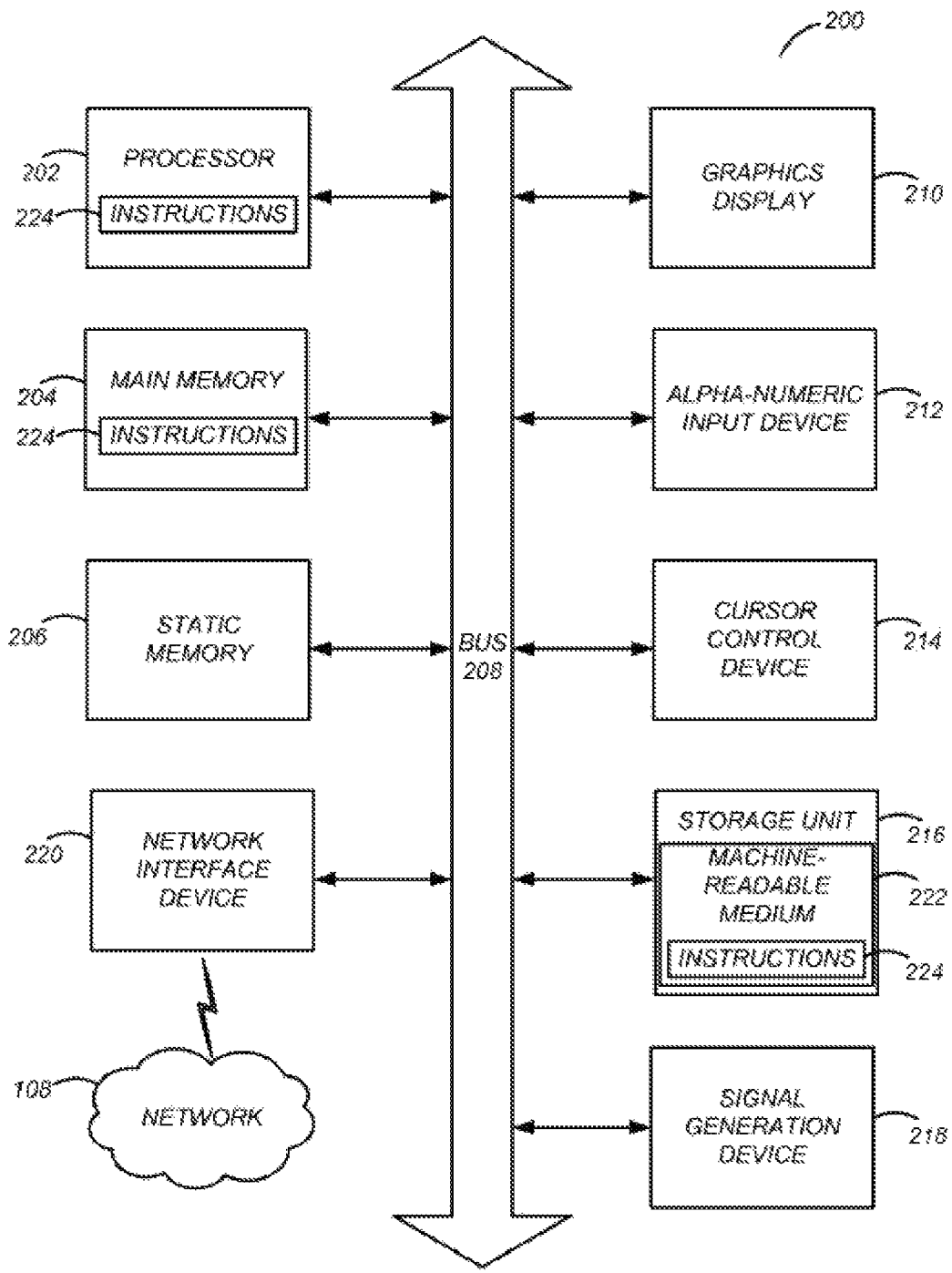
FIG. 2 illustrates one embodiment of components of an example machine able to read instructions from a machine-readable medium and execute them in a processor (or controller).

FIG. 2 is a block diagram illustrating components of an example machine able to read instructions from a machine-readable medium and execute them in a processor or multiple processors (or controller or multiple controllers). Specifically, FIG. 2 shows a diagrammatic representation of a machine in the example form of a computer system 200 within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine for this configuration may be a mobile computing devices such as a tablet computer, an ultrabook (or netbook) computer, a personal digital assistant (PDA), a cellular telephone, a smartphone, a web appliance, or like machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes one or more processors 202 (e.g., a central processing unit (CPU) and may also include a graphics processing unit (GPU), a digital signal processor (DSP), one or more application specific integrated circuits (ASICs), one or more radio-frequency integrated circuits (or chipset) (RFICs), a wireless fidelity (WiFi) chipset, a global positioning system (GPS) chipset, an accelerometer (one, two, or three-dimensional), or any combination of these). The computer system 200 also includes a main memory 204 and a static memory 206. The components of the computer system 200 are configured to communicate with each other via a bus 208. The computer system 200 may further include graphics display unit 210 (e.g., a plasma display panel (PDP), a liquid crystal display (LCD)) which may be configured for capacitive or inductive touch sensitivity to allow for direct interaction with software user interfaces through the display 210. The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over the network 108 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

PROCESSES AND EXAMPLES

Figure 3:
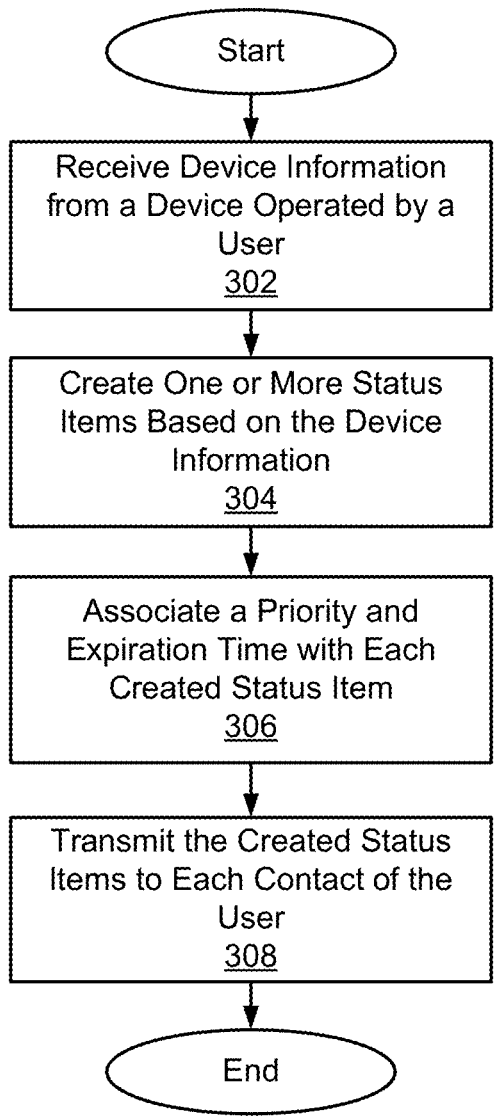
FIG. 3 is a flow chart illustrating operations of a messaging system in processing device information received from a device according to one embodiment.

FIG. 3 is a flowchart illustrating operations of the messaging system in processing device information received from a user device 102 according to one embodiment. Those of skill in the art will recognize that other embodiments can perform the steps of FIG. 3 in different orders. Moreover, other embodiments can include different and/or additional steps than the ones described herein. Likewise, multiple instances of the steps may be performed in parallel.

The messaging system 106 receives 302 device information from a user device 102 operated by a user of the system 106. The messaging system 106 creates 304 one or more status items based on the received device information. The messaging system 106 associates 306 a priority and an expiration time with each created status item.

The messaging system 106 transmits 308 the created status items to each contact of the user, along with the associated priority and expiration time. In other embodiments, the messaging system 106 transmits the status items to only certain contacts of the user (to a subset of the contacts).

Figure 4:
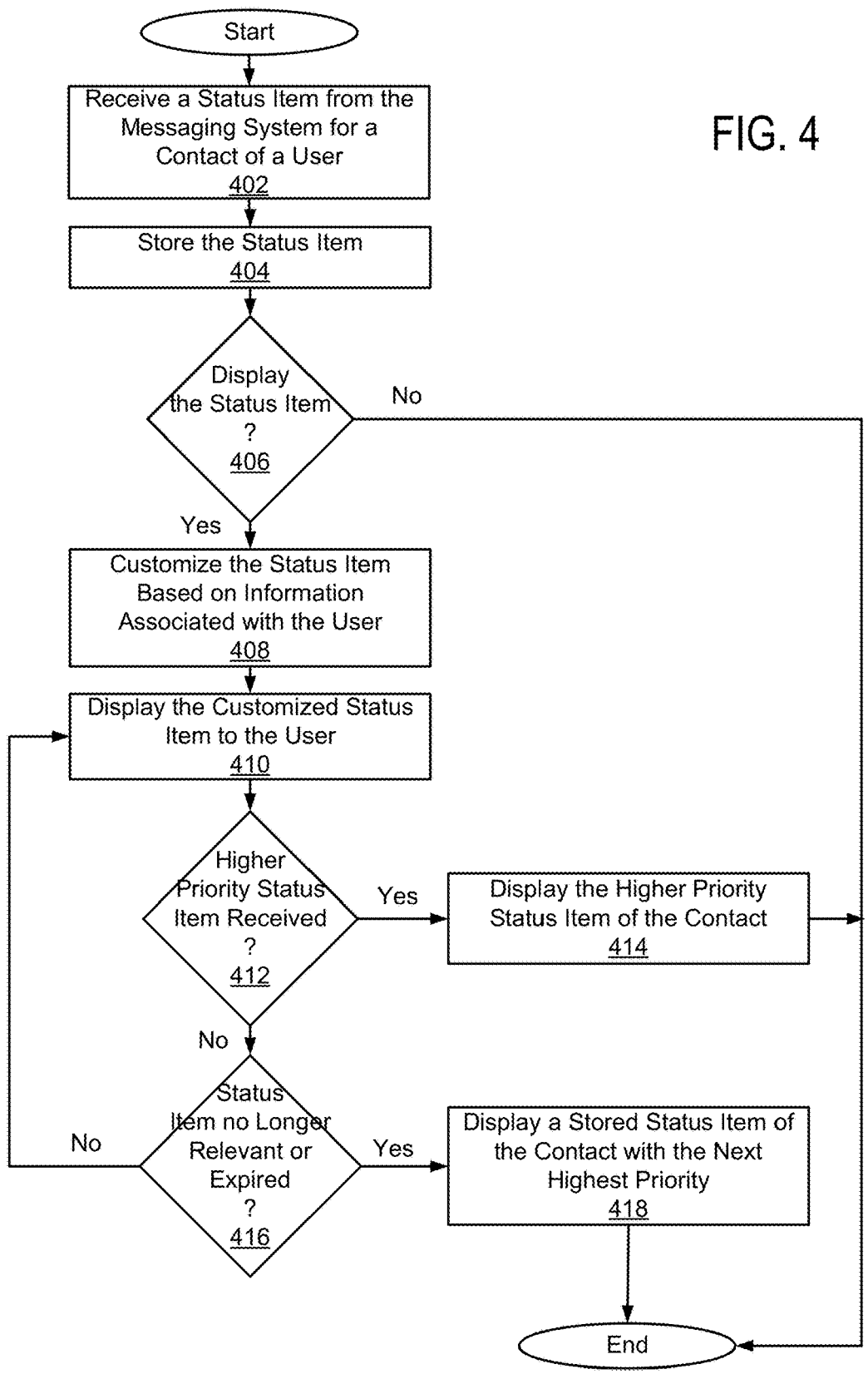
FIG. 4 is a flow chart illustrating operations of a user device in processing a received status item according to one embodiment.

FIG. 4 is a flow chart illustrating operations of a user device 102 in processing a status item received from the messaging system 106 according to one embodiment. Those of skill in the art will recognize that other embodiments can perform the steps of FIG. 4 in different orders. Moreover, other embodiments can include different and/or additional steps than the ones described herein. Likewise, multiple instances of the steps may be performed in parallel.

Assume for purposes of this example that a user of the device 102 is currently viewing a status interface that includes a feed with multiple status items associated with the user's contacts. The user device 102 receives 402 a status item from the messaging system 106 for a contact of the user. The user device 102 stores 404 the status item.

Further, the user device 102 determines 406 whether to display the status item in the status interface's feed. In one embodiment, the device 102 determines to display the status item if the feed does not currently include a status item for the contact or if the received status item has a higher priority than a status item currently included in the feed for the contact. If the device 102 determines not to display the status item, the processing of the status item ends for the time being. The device 102 may later determine to present the status item, for example, if the status item is the item with the next highest priority after a status item displayed for the contact expires.

On the other hand, if the user device 102 determines to the display the status item, the user device 102 customizes 408 the status item based on information associated with the user. The user device 102 displays 410 the customized status item to the user in the feed. During the display of the customized status item, if a higher priority status item is received 412 by the user device 102 for the contact, the device 102 displays 414 the higher priority status item in the feed (e.g., after customizing the higher priority status item) and removes from the feed the customized status item currently being displayed. If the user device 102 receives 416 information from the messaging system 106 indicating that the customized status item being displayed is no longer relevant or if the expiration time of the customized status item is reached (the status item expires), the user device 102 displays 418 in the feed a status item stored for the contact that has the next highest priority. Further the customized status item is removed from the feed and deleted from the device's storage. Otherwise, the user device 102 continues to display 410 the customized status item in the feed.

Figure 5:
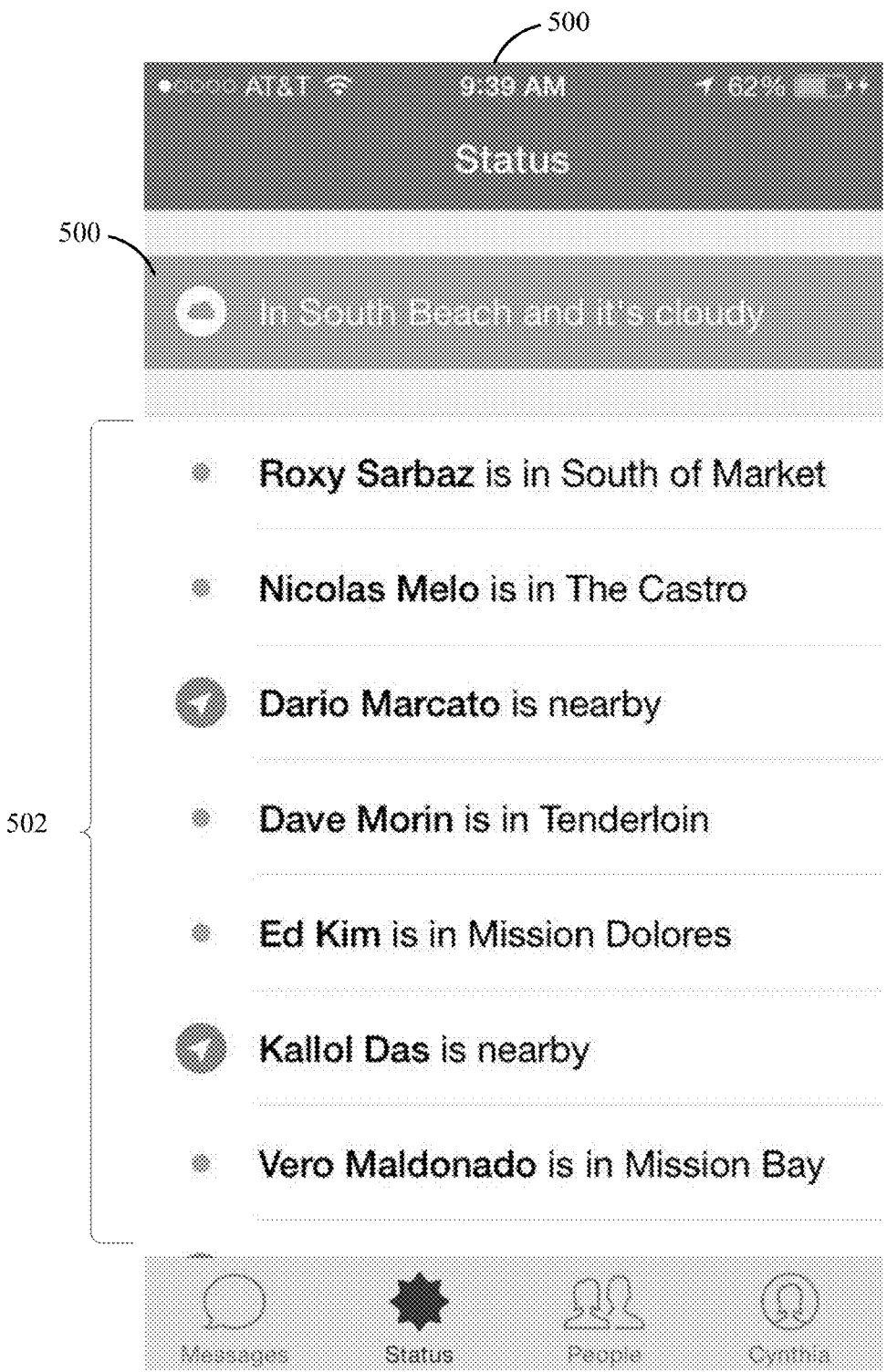

FIG. 5-13 illustrate examples of a status interface presented to a user on a device 102 according to one embodiment. FIG. 5 illustrates the status interface 500. At the top of the interface 500 is a location status item 502 of the user indicating that the user is "In South Beach and it's cloudy." Below status item 502 is a feed that includes status items of the user's contacts.

Figure 6:
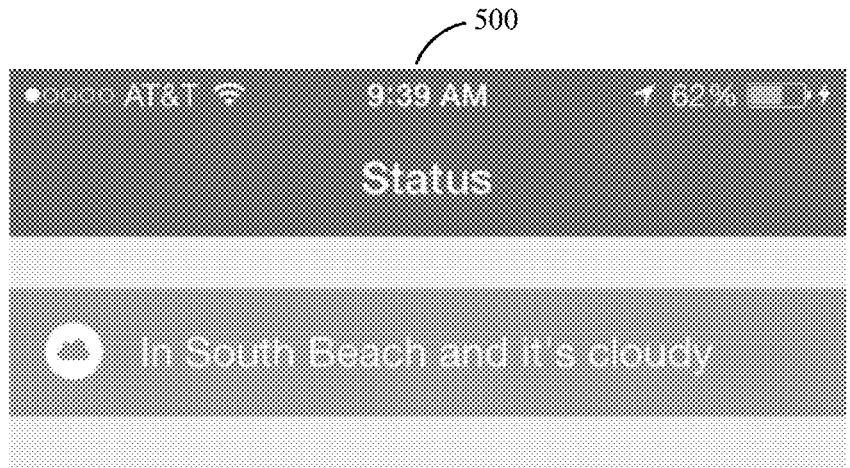
Figure 7:
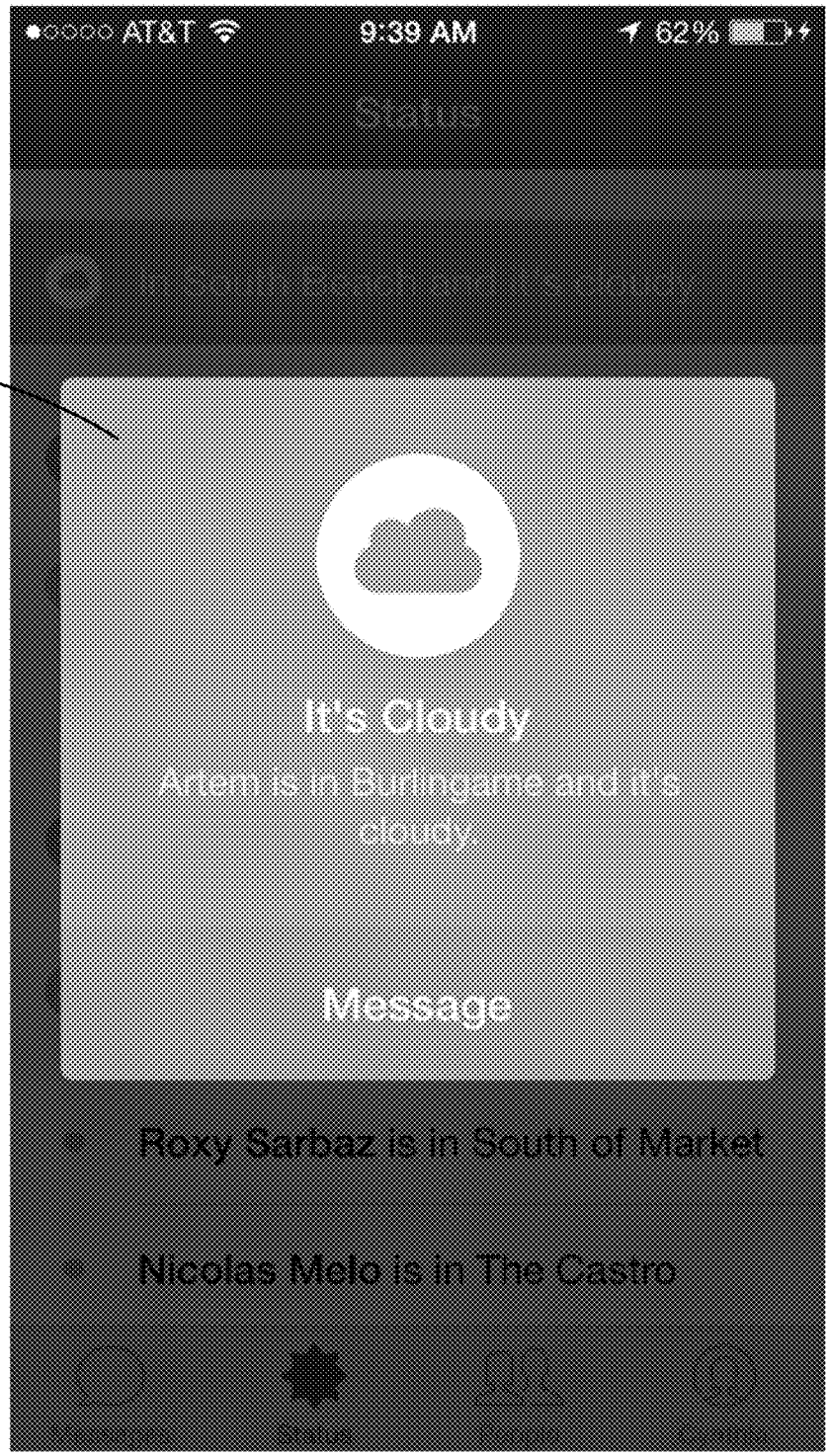

FIG. 6 illustrates a new status item 602 added to the feed for a contact of the user, Artem Nezvigin. If the user selects the new status item 602 (or the icon of the item 602), an interface 700 is presented to user which includes the information of the status item and can be used to initiate the sending of a message to the contact, as illustrated by FIG. 7. In one embodiment, the status item 602 and the interface 700 can be accesses through other locations other than the feed.

Figure 9:
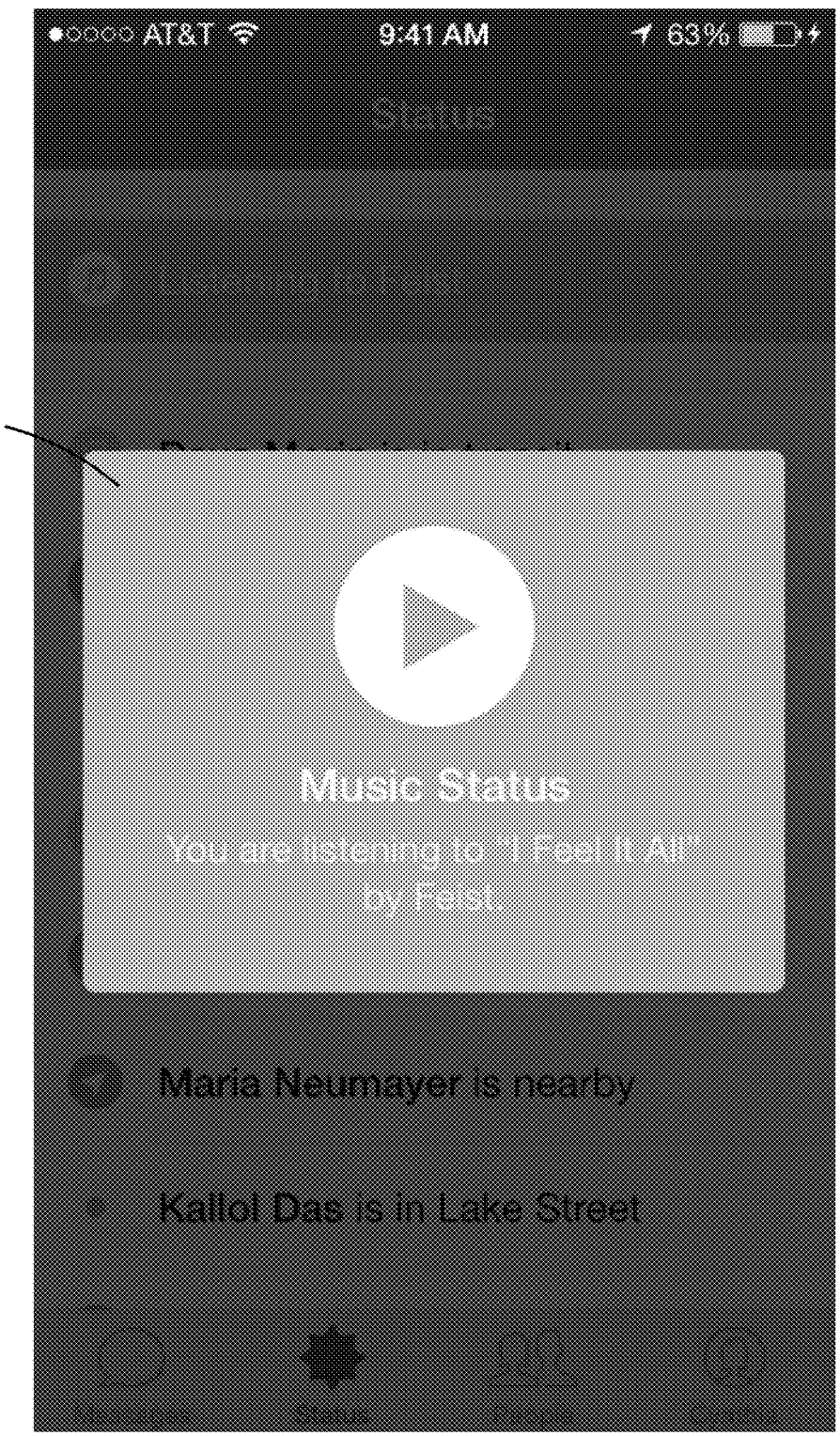
Figure 10:
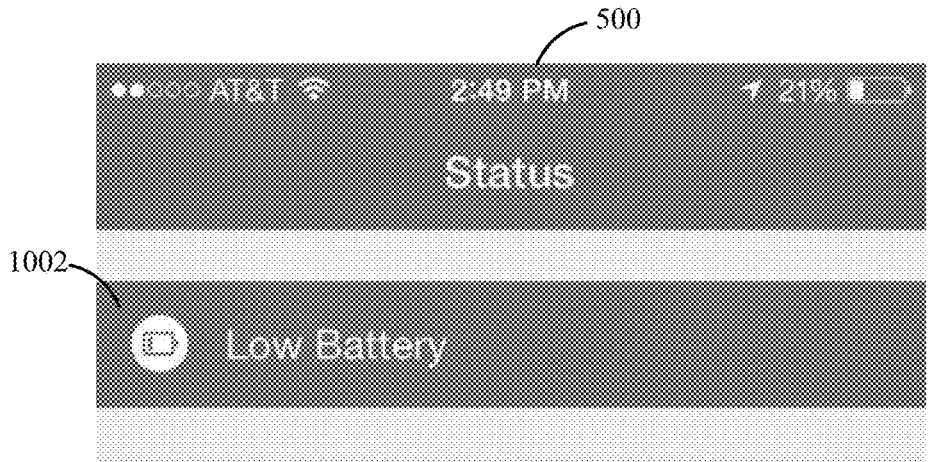
Figure 11:
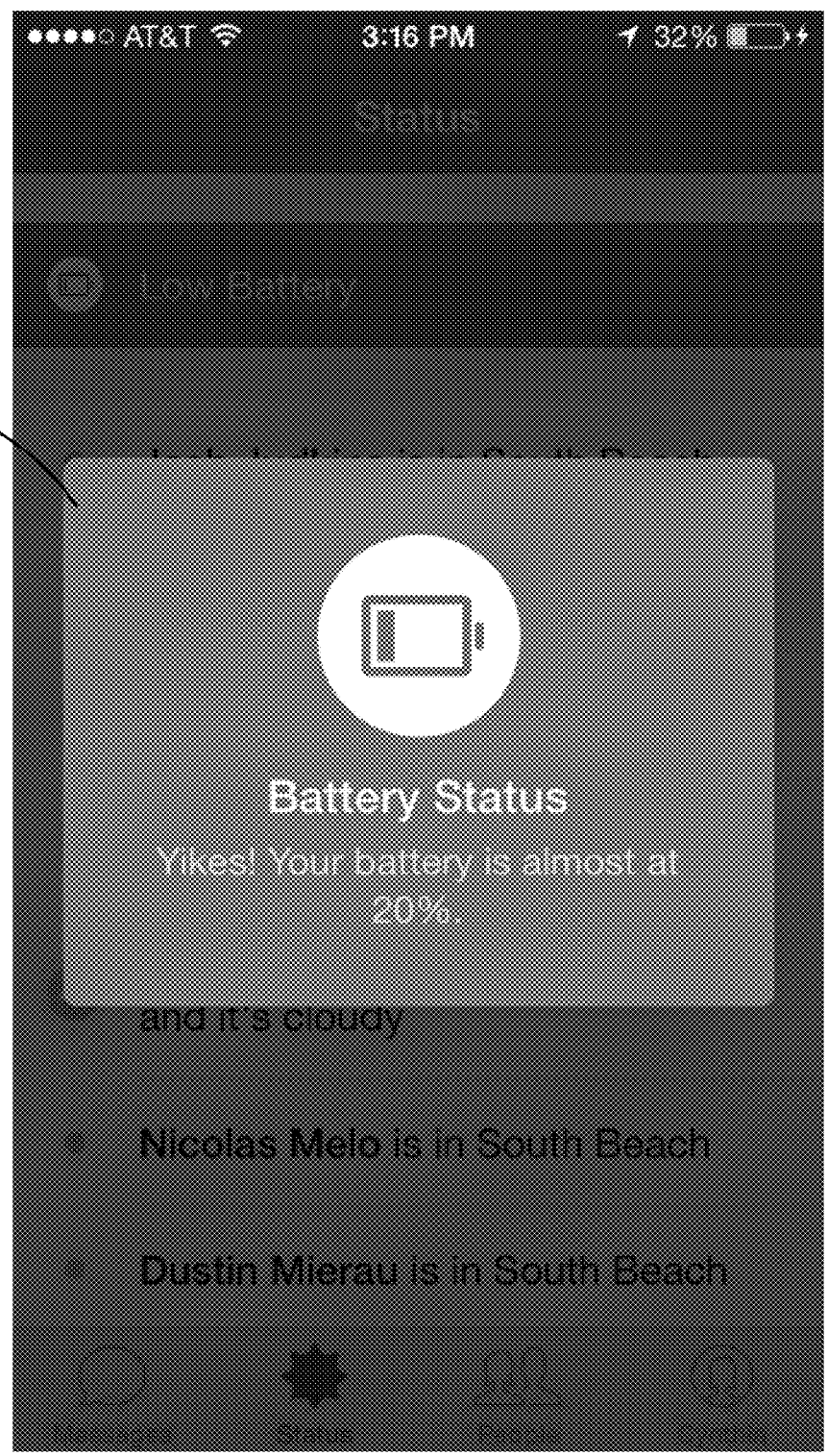

FIG. 8 illustrates the status item of the user changing from status item 502 to a music status item 802 indicating that the user is "Listening to Feist." If the user selects status item 802, an interface 900 is presented to the user with details as to the song the user is listening to, as illustrated by FIG. 9. FIG. 10 illustrates the status item of the user changing from music status item 802 to a battery status item 1002 indicating that the user's device 102 has a "Low Battery." If the user selects status item 1002, an interface 1100 is presented to the user with details as to the state of charge of the user device's battery, as illustrated by FIG. 11.

Figure 12:
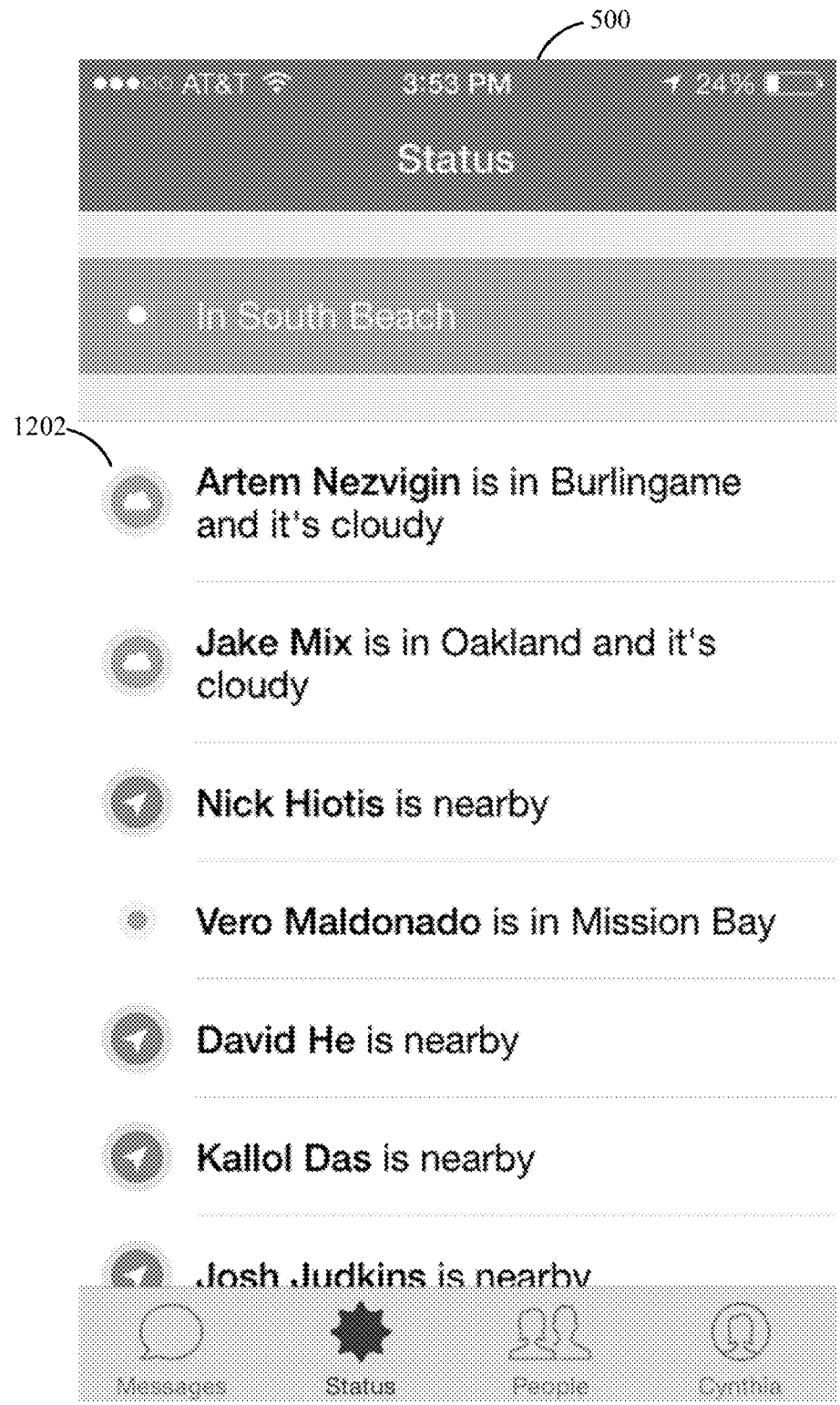
Figure 13:
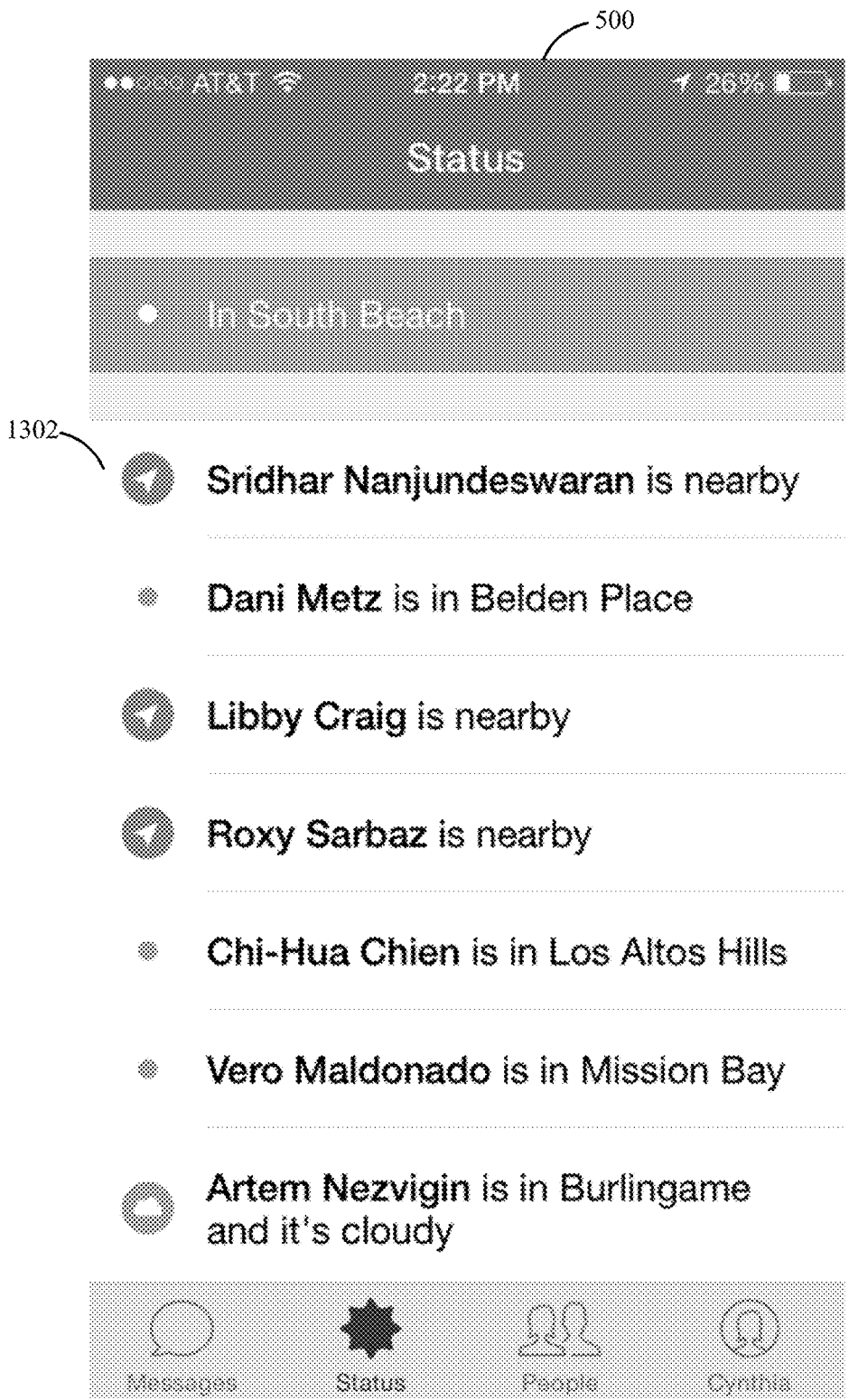

FIGS. 12 and 13 illustrate location status items being customized according to the location of the user. As indicated above, the user is currently in South Beach. In FIG. 12, status item 1202 is displayed indicating that contact, Artem Nezvigin is in the city of Burlingame. Since the contact is in a different city than the user, the status item displays the name of the city and the weather of the city where the contact is located. In FIG. 13, status item 1302 indicates that contact, Sridhar Nanjundeswaran is nearby because the contact is currently in the same city and neighborhood as the user.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 202, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   receiving, by a user device operated by a user from a messaging system, a status item indicating information associated with a contact with which the user exchanges messages via the messaging system, the status item created by the messaging system based on device information associated with a contact device operated by the contact, wherein at least one of a priority and an expiration time associated with the received status item is determined based on a type of the received status item, the type being determined based on which information is included in the device information;

storing, by the user device, the received status item;

responsive to the received status item having a higher priority than a current status item associated with the contact, determining, by the user device, to display the received status item;

responsive to determining to display the received status item, customizing, by the user device, the received status item based on the information associated with the user;

displaying, by the user device, the customized status item in a status interface;

removing, by the user device, the current status item from the status interface; and responsive to the customized status item expiring based on the expiration time associated with the customized status item, removing the customized status item from the status interface.

2. The method of claim 1, wherein at least one of the priority and the expiration time associated with the received status item including a geographic location of the contact device is different from at least one of the priority and the expiration time associated with the received status item including a state of charge of the contact device.

3. The method of claim 1, wherein the status interface includes a plurality of status items, each of the plurality of status items describing information associated with a different contact of the user.

4. The method of claim 1, wherein the current status item is displayed at a location of the status interface and displaying the customized status item comprises:

replacing the current status item with the customized status item at the location of the status interface.

5. A computer-implemented method comprising:

receiving, by a user device associated with a user from a messaging system, a status item indicating information associated with a contact of the user, the status item created by the messaging system based on device information provided by a contact device associated with the contact;

determining, by the user device, whether to display the status item in a status interface including a plurality of customized status items based on a priority of the status item, wherein the priority is determined based on a type of the status item, the type being determined based on which information is included in the device information;

responsive to determining to display the status item, customizing, by the user device, the status item based on the information associated with the user; and displaying, by the user device, the customized status item in the status interface.

6. The method of claim 5, wherein the status item indicates a location of the contact and the status item is customized based on a location of the user.

7. The method of claim 5, wherein customizing the status item comprises:

responsive to the status item indicating the contact is in a city that is different than a city that the user is located at, including weather information with the status item, the weather information associated with the city that the contact is in.

8. The method of claim 5, wherein the device information provided by the contact device includes at least one of: a geographic location of the contact device, a state of charge of the contact device, an indication of a media item being presented by the contact device, an indication of an activity performed by the contact with the contact device, and an indication of an application executing on the contact device.

9. The method of claim 5, wherein the contact has a plurality of contacts and the messaging system transmits the status item to each of the plurality of contacts.

10. The method of claim 5, wherein the messaging system transmits the status item to the user device based on one or more of the following: preferences associated with the contact, a type of the information indicated by the status item, a time of a previous communication exchanged between the contact and the user through the messaging system, a proximity between the contact and the user, the user device having an expired status item associated with the contact.

11. The method of claim 5, wherein the method further comprises:

responsive to the customized status item expiring based on an expiration time associated with the customized status item, removing the customized status item from the status interface.

12. The method of claim 5, wherein the user device stores a set of status items that have not expired and indicate information associated with the contact, and determining whether to display comprises:

determining to display the received status item in response to the received status item having a higher priority than each status item from the set.

13. A computer-implemented method comprising:

receiving, by a user device associated with a user from a messaging system, a status item indicating information associated with a contact of the user, the status item created by the messaging system based on device information provided by a contact device associated with the contact;

determining, by the user device, whether to display the status item in a status interface including a plurality of customized status items;

responsive to determining to display the status item, customizing, by the user device, the status item based on information associated with the user; and displaying, by the user device, the customized status item in the status interface, wherein the status item indicates a city and a neighborhood in the city that the contact is located at and customizing the status item comprises, responsive to the user being in the city but in a different neighborhood than the contact, modifying the status item to include the neighborhood and not include the city.

14. A computer-implemented method comprising:

receiving, by a user device associated with a user from a messaging system, a status item indicating information associated with a contact of the user, the status item created by the messaging system based on device information provided by a contact device associated with the contact;

determining, by the user device, whether to display the status item in a status interface including a plurality of customized status items;

responsive to determining to display the status item, customizing, by the user device, the status item based on information associated with the user; and displaying, by the user device, the customized status item in the status interface, wherein the status item indicates a neighborhood in a city that the contact is located at, and customizing the status item comprises, responsive to the user being in the neighborhood, modifying the status item to indicate that the contact is nearby and not include the neighborhood.

15. A computer program product comprising a non-transitory computer-readable storage medium containing computer program code for:

receiving, by a user device associated with a user from a messaging system, a status item indicating information associated with a contact of the user, the status item created by the messaging system based on device information provided by a contact device associated with the contact;

determining, by the user device, whether to display the status item in a status interface including a plurality of customized status items;

responsive to determining to display the status item, customizing, by the user device, the status item based on information associated with the user; and displaying, by the user device, the customized status item in the status interface based on an expiration time associated with the customized status item, wherein the expiration time is determined based on a type of the customized status item, the type being determined based on which information is included in the device information.

16. The computer program product of claim 15, wherein the status item indicates a location of the contact and the status item is customized based on a location of the user.

17. The computer program product of claim 15, wherein customizing the status item comprises:

responsive to the status item indicating the contact is in a city that is different than a city that the user is located at, including weather information with the status item, the weather information associated with the city that the contact is in.

18. The computer program product of claim 15, wherein the status item indicates a city and a neighborhood in the city that the contact is located at and customizing the status item comprises:

responsive to the user being in the city but in a different neighborhood than the contact, modifying the status item to include the neighborhood and not include the city;

responsive to the user being in the city and in the neighborhood, modifying the status item to indicate that the contact is nearby and not include the neighborhood.

19. The computer program product of claim 15, wherein the status item indicates a media item being presented to the contact on the contact device and customizing the status item comprises:

responsive to the user having previously accessed the media item, modifying the status item to include an additional media item previously presented to the contact.

20. A computer-implemented method comprising:

receiving, by a messaging system from a contact device associated with a contact of a user, information associated with the contact;

creating, by the messaging system, a customized status item indicating information associated with the contact based on the received information and information associated with the user;

assigning, by the messaging system, a priority to the customized status item; and transmitting, by the messaging system to a user device associated with the user, the customized status item, wherein the user device determines based on the assigned priority whether to display the customized status item in a status interface including a plurality of customized status items associated with contacts of the user, and the priority of the customized status item is determined based on a type of the customized status item, and the type being determined based on which information is included in the received information.

21. A computer-implemented method comprising:

receiving, by a user device associated with a user from a messaging system, a status item indicating information associated with a contact of the user, the status item created by the messaging system based on device information provided by a contact device associated with the contact;

determining, by the user device, whether to display the status item in a status interface including a plurality of customized status items;

responsive to determining to display the status item, customizing, by the user device, the status item based on information associated with the user; and displaying, by the user device, the customized status item in the status interface, wherein the status item indicates a media item being presented to the contact on the contact device, and customizing the status item comprises responsive to the user having previously accessed the media item, modifying the status item to include an additional media item previously presented to the contact.

* * * * *